(12) United States Patent
Hasegawa et al.

(10) Patent No.: US 7,377,549 B2
(45) Date of Patent: May 27, 2008

(54) PROTECTOR FOR A SADDLE RIDE TYPE ALL-TERRAIN VEHICLE

(75) Inventors: Yosuke Hasegawa, Wako (JP); Akio Handa, Wako (JP); Masahiro Inoue, Wako (JP); Makoto Toda, Wako (JP); Hiroaki Tomita, Wako (JP); Keita Yagi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 288 days.

(21) Appl. No.: 11/050,831

(22) Filed: Jan. 27, 2005

(65) Prior Publication Data

US 2005/0167179 A1 Aug. 4, 2005

(30) Foreign Application Priority Data

Jan. 30, 2004 (JP) ............................. 2004-024689
Sep. 3, 2004 (JP) ............................. 2004-257315

(51) Int. Cl.
| | |
|---|---|
| B62D 25/20 | (2006.01) |
| B62D 61/06 | (2006.01) |
| B62D 61/02 | (2006.01) |
| B62D 27/00 | (2006.01) |
| B60J 11/00 | (2006.01) |
| G05G 25/00 | (2006.01) |

(52) U.S. Cl. ................. 280/770; 280/157; 464/170; 74/608; 74/609; 74/612; 172/508; 296/38; 180/69.1; 180/210; 180/217; 180/219

(58) Field of Classification Search ............... 464/170; 74/608, 609, 612; 180/69.1, 210, 217, 219; 280/770, 157; 172/508; 296/38, 188
See application file for complete search history.

(56) References Cited

U.S. PATENT DOCUMENTS

| | | | | |
|---|---|---|---|---|
| 4,308,931 | A * | 1/1982 | Khanna .................. | 180/235 |
| 4,655,307 | A * | 4/1987 | Lamoureux ............. | 180/69.1 |
| 5,794,976 | A * | 8/1998 | Stevicks ................ | 280/770 |
| 5,915,728 | A * | 6/1999 | Blackburn .............. | 280/847 |
| 6,354,953 | B1 * | 3/2002 | Herchenbach et al. ..... | 464/170 |
| 6,692,366 | B1 * | 2/2004 | Savant .................. | 464/170 |
| 7,055,895 | B1 * | 6/2006 | King et al. ............. | 296/204 |
| 2002/0056586 | A1 | 5/2002 | Kawamoto et al. | |
| 2002/0160842 | A1 * | 10/2002 | Ramey .................. | 464/170 |
| 2003/0066696 | A1 | 4/2003 | Nakamura | |

FOREIGN PATENT DOCUMENTS

JP 6-37090 5/1994

\* cited by examiner

*Primary Examiner*—Christopher Ellis
*Assistant Examiner*—John R Olszewski
(74) *Attorney, Agent, or Firm*—Westerman, Hattori, Daniels & Adrian, LLP.

(57) ABSTRACT

A saddle ride type all-terrain vehicle includes left and right front wheels supported independently of each other on a vehicle body such that driving power is transmitted to said front wheels by way of a pair of left and right drive shafts extending from a driving source side. The vehicle also includes universal couplings provided at opposite end portions of each of the drive shafts, covered by rubber boots. The vehicle further includes a protector for covering the rubber boots.

12 Claims, 14 Drawing Sheets

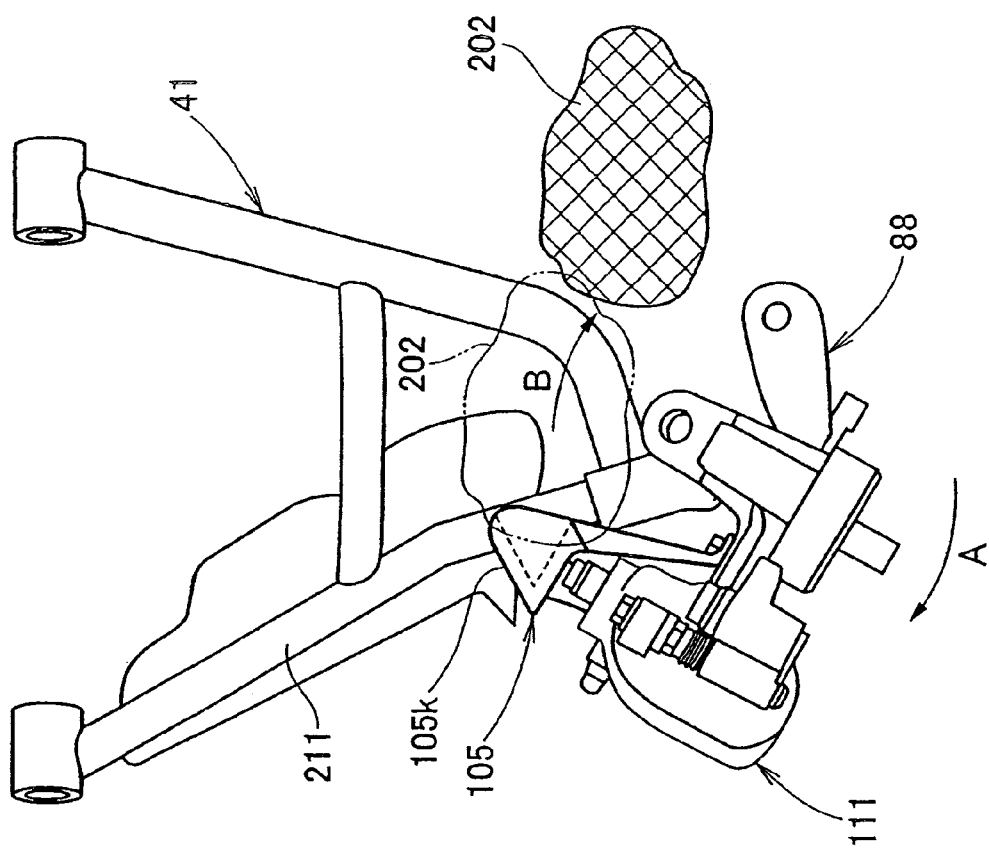
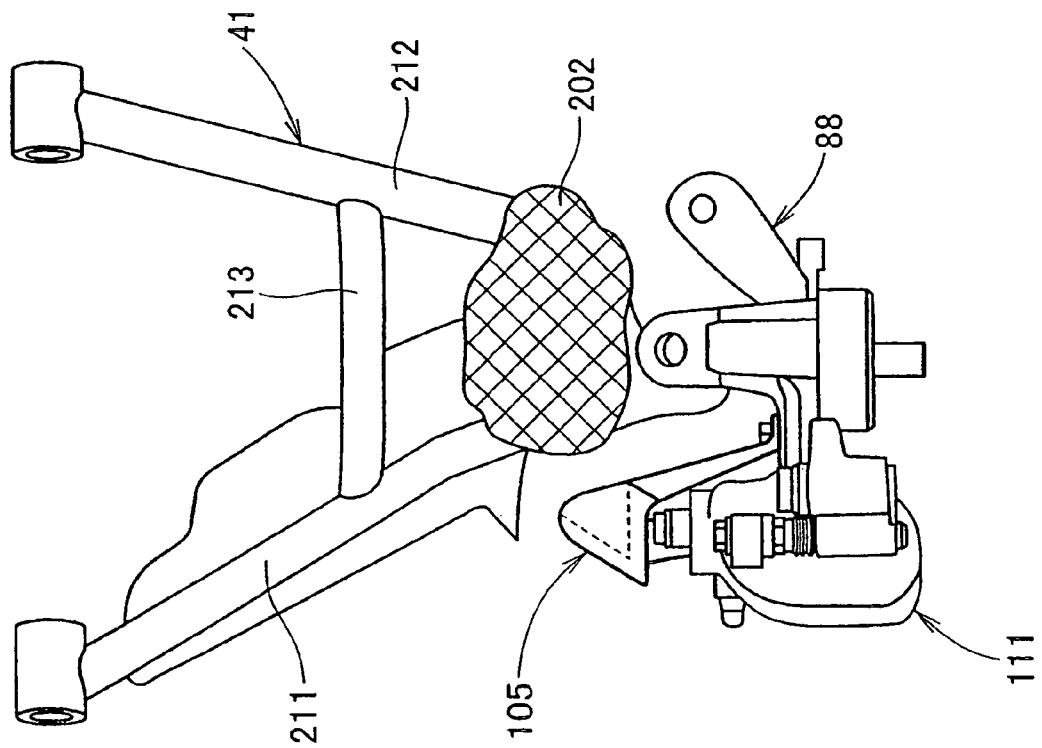
FIG. 8A (a)
FIG. 8B (b)

(a)

(b)

PROTECTOR FOR A SADDLE RIDE TYPE ALL-TERRAIN VEHICLE

FIELD OF INVENTION

This invention relates to a protector for a saddle ride type all-terrain vehicle.

BACKGROUND OF THE INVENTION

In general, a protector for a saddle ride type all-terrain vehicle (hereinafter referred to as "ATV") is known wherein the protector is attached to a suspension arm.

A protector of this type has an upper side arm member attached for upward and downward movement on a frame through a bearing, and a lower side arm member attached for upward and downward movement on the frame through a bearing. A protector of this type also has a knuckle connected to free ends of the upper side arm member and the lower side arm member, and a front wheel attached to the knuckle for rotation. A protector of this type also has a drive shaft structure for transmitting driving force, wherein a guard plate is attached to the lower side arm member. One example of such a structure is disclosed in Japanese Utility Model Laid-open No. Hei 6-37090.

FIG. 3 of Japanese Utility Model Laid-open No. Hei 6-37090 is shown as FIG. 14 in the present application. It is to be noted that reference numerals are re-numbered.

FIG. 14 is a front elevational view of a conventional protector for an ATV. An upper side arm member 203 is attached for upward and downward movement on a frame 201 through a bearing 202, and a lower side arm member 206 is attached similarly for upward and downward movement on the frame 201 through a bearing 204. A knuckle 207 is connected to free ends of the upper side arm member 203 and the lower side arm member 206, and a front wheel 208 is attached for rotation on the knuckle 207. A drive shaft 211 extends from a front wheel def (not shown) on the driving source side to the front wheel 208 to form a structure for transmitting driving force. A guard plate 212 is attached to the lower side arm member 206.

According to the structure disclosed in FIG. 14, although the guard plate 212 covers a central portion of the drive shaft 211, it does not cover the opposite end portions of the drive shaft 211. Therefore, another countermeasure is sometimes required, for example, against a flying stone or the like from a place in the proximity of the frame 201 or from a place in the proximity of the knuckle 207.

For example, when the front wheel 208 is steered, since the knuckle 207 is rocked to move forwardly and backwardly together with the front wheel 208, a rubber boot that covers a front portion of the drive shaft 211, for example, a universal coupling provided on the drive shaft 211, is sometimes detached from the guard plate 212.

Further, where a brake caliper for a disk brake is attached to the knuckle 207, the guard plate 212 is sometimes disposed in a spaced relationship by a great distance from the knuckle 207 so that, upon steering of the front wheel 208, the brake caliper may not interfere with the guard plate 212. In this instance, since the gap between the guard plate 212 and the rubber boot becomes greater, the possibility that a countermeasure for the rubber boot may be required increases. It is an object of the present invention to improve a protector for an ATV to effectively protect a rubber boot provided for a drive shaft, particularly for a universal coupling.

In the case of such a structure adapted for an ATV, although the guard plate covers a central portion of the drive shaft, it does not cover the opposite end portions of the drive shaft. Therefore, another countermeasure is sometimes required, for example, against a flying stone or the like from a place in the proximity of the frame or from a place in the proximity of the knuckle.

Also, in the case of such a structure, when the front wheel is steered, since the knuckle is rocked to move forwardly and backwardly together with the front wheel, a rubber boot that covers a front portion of the drive shaft, for example, a universal coupling provided on the drive shaft, is sometimes detached from the guard plate.

Further, where a brake caliper is attached to the knuckle, the guard plate is often disposed an even greater distance from the knuckle so that, upon steering of the front wheel, the brake caliper does not interfere with the guard plate. Because of this, a countermeasure may be required for protecting the rubber boot.

Moreover, an ATV often travels on muddy and/or snowy surfaces. Because of this, a location behind the guard plate sometimes becomes a place where mud, snow, or the like is piled up on the lower arm member. Although the mud, snow, or the like may be removed before traveling or after traveling, removal of the mud, snow, or the like by manual operation is cumbersome.

Thus, it is an object of the present invention to improve a protector for an ATV to effectively protect a rubber boot provided for a drive shaft, particularly for a universal coupling. Furthermore, it is an object of the present invention to allow for easy removal of mud, snow, or the like piled up on a suspension arm in an ATV without depending on manual operation.

SUMMARY OF THE INVENTION

The present invention addresses the above described conditions. According to the present invention, in order to attain the above objects, a first aspect of the present invention provides an ATV which includes left and right front wheels that are supported independently of each other on a vehicle body such that driving power is transmitted to the front wheels by means of a pair of left and right drive shafts extending from a driving source side and universal couplings provided at the opposite end portions of the drive shafts are covered with rubber boots. A protector for covering each of the rubber boots is provided.

The rubber boots provided at the opposite end portions of the drive shaft can be protected by the protectors, and such a situation that a flying stone or muddy water splashes to or a low tree hits upon the rubber boots can be prevented by the protector.

In a second aspect of the present invention, the protector includes a driving source side protector (inboard side guard member) and a front wheel side protector (outboard side guard member) for protecting the rubber boots separately from each other.

Since the protectors are provided separately as the inboard side guard member and the outboard side guard member, the shape of the inboard side guard member and the outboard side guard member can be determined in accordance with the respective rubber boots.

In a third aspect of the present invention, the inboard side guard member is attached to a suspension arm on which the front wheel is supported for upward and downward movement, and the outboard side guard member is attached to a knuckle on which the front wheel is supported for rotation.

Since the inboard side guard member and the outboard side guard member are attached to the suspension arm and the knuckle individually having a high rigidity, the inboard side guard member and the outboard side guard member can be supported with certainty. Further, for example, when the front wheels are steered, with a conventional protector, the rubber boot is sometimes spaced away from the protector. However, according to the present invention, since the outboard side guard member is attached to the knuckle, the outboard side guard member is rocked together with the knuckle and consequently the outboard side guard member is not likely to be spaced away from the rubber boot.

In a fourth aspect of the present invention, the outboard side guard member is a member having an arcuate convex face directed forwardly.

The front side of the rubber boot can be protected with certainty by the arcuate outboard side guard member, which extends along the rubber boot.

In a fifth aspect of the present invention, the outboard side guard member is formed integrally with a knuckle on which the front wheel is supported for rotation.

Since the outboard side guard member is formed integrally with the knuckle, the number of parts can be reduced.

In a sixth aspect of the present invention, the inboard side guard member is attached to a location of the suspension arm rather near to the center of the vehicle body.

The inboard side guard member is arranged at a position of the suspension arm rather near to the center of the vehicle body to make the upward and downward movement of the inboard side guard member small.

In a seventh aspect of the present invention, the inboard side guard member is attached to a bracket provided spanning two pipes forming the suspension arm.

Since the bracket for attaching the inboard side guard member thereto is provided spanning the two pipes of the suspension arm, the bracket can be attached firmly to the suspension arm.

In an eighth aspect of the present invention, the inboard side guard member and the outboard side guard member are disposed in an overlapping relationship with each other as viewed in front elevation.

Since the inboard side guard member and the outboard side guard member are disposed in an overlapping relationship with each other as viewed in front elevation, the shaft of the universal joints of the drive shaft can also be protected. Further, for example, it becomes possible to extend the inboard side guard member to the outboard side guard member such that the inboard side guard member protects a portion that cannot be protected readily by the outboard side guard member.

In a ninth aspect of the present invention, the outboard side guard member is formed such that an end portion thereof extends inwardly obliquely rearwardly of the vehicle body.

Since the outboard side guard member is formed such that the end portion thereof extends rearwardly of the vehicle body, when the vehicle is steered, the end portion serves as a scraper rocked around the center of rotation of the knuckle. Consequently, the end portion can easily scrape off or break mud, snow, or the like piled up on the lower arm or can push away the piled up substance.

In a tenth aspect of the present invention, the outboard side guard member is formed such that the end portion thereof extends inwardly of the vehicle body.

Since the outboard side guard member is formed such that the end portion thereof extends inwardly of the vehicle body, the end portion substantially coincides with the direction in which a tangential line to an arc centered at the axis of rotation of the knuckle extends. Therefore, when the vehicle is steered and the outboard side guard member is moved together with the knuckle, the end portion serves as a scraper that is rocked around the center of rotation of the knuckle. Consequently, the end portion can easily scrape off or break mud, snow, or the like piled up on the lower arm or can push away the piled up substance.

In an eleventh aspect of the present invention, the inboard side guard member covers a front portion and a front lower portion of the lower arm and includes an upright portion disposed in the proximity of a range of movement of the end portion of the outboard side guard member.

Since the upright portion is provided on the inboard side guard member, the upright portion can protect a front portion and a front lower portion of the lower arm. Further, the upright portion is disposed in the proximity of the range of movement of the end portion of the outboard side guard member. Thus, the inboard side guard member and the outboard side member can protect the substantially overall area of the drive shaft within the range from the center side of the vehicle body to the knuckle.

In a twelfth aspect of the present invention, the lower arm includes a front arm provided on the front side of the vehicle and a rear arm provided rearwardly of the front arm, and the end portion of the outboard side guard member overlaps with the front arm as viewed in plan when the wheels are steered in the maximum.

Since the end portion of the outboard side guard member is formed such that it overlaps with the front arm as viewed in plan when the wheel is steered in the maximum, the end portion of the outboard side guard member can scrape off, break, or push away mud, snow, or the like piled up on the lower arm.

In a thirteenth aspect of the present invention, the outboard side guard member is a member wherein a caliper guard portion for covering the brake caliper from the inner side and the end portion provided at an end portion of the caliper guard member are formed integrally with each other.

Since the caliper guard portion and the end portion are formed integrally with each other, the number of parts can be reduced.

According to the first aspect of the present invention, the universal joints provided at the opposite end portions of the drive shaft can be protected by the protectors, and the universal points, particularly, the rubber boots provided on the universal joints, can be protected from a flying stone, mud water, a low tree, and so forth.

According to the second aspect of the present invention, since the protectors are provided separately as the inboard side guard member and the outboard side guard member, the shape of the inboard side guard member and the outboard side guard member can be determined in accordance with the respective rubber boots, and the rubber boots can be protected efficiently.

According to the third aspect of the present invention, since the inboard side guard member and the outboard side guard member are attached to the suspension arm and the knuckle individually having a high rigidity, the inboard side guard member and the outboard side guard member can be supported with certainty. Further, for example, when the front wheels are steered, with a conventional protector, the rubber boot is sometimes spaced away from the protector and comes out of the range of protection. However, according to the present invention, since the outboard side guard member is attached to the knuckle, the outboard side guard member is rocked together with the knuckle and consequently the outboard side guard member is not likely to be spaced away from the rubber boot. Consequently, also upon steering of the front wheels, the protection effect of the outboard side guard member can be maintained.

According to the fourth aspect of the present invention, the front side of the rubber boot can be covered and protected with certainty by the arcuate outboard side guard member, which extends along the rubber boot.

According to the fifth aspect of the present invention, since the outboard side guard member is formed integrally with the knuckle, the number of parts can be reduced and the cost can be reduced.

According to the sixth aspect of the present invention, since the inboard side guard member is arranged at a position of the suspension arm rather near to the center of the vehicle body to make the upward and downward movement of the inboard side guard member small, the rubber boot can be protected effectively.

According to the seventh aspect of the present invention, since the bracket for attaching the inboard side guard member thereto is provided spanning two pipes of the suspension arm, the bracket can be attached firmly to the suspension arm, and the inboard side guard member can be supported with certainty by the bracket.

According to the eighth aspect of the present invention, since the inboard side guard member and the outboard side guard member are disposed in an overlapping relationship with each other as viewed in front elevation, also the shaft of the universal joints of the drive shaft can be protected and the range of protection can be increased. Further, for example, it becomes possible to extend the inboard side guard member to the outboard side guard member such that the inboard side guard member protects a portion that cannot be protected readily by the outboard side guard member, and the protection of the rubber boot for the drive shaft can be performed with a higher degree of certainty.

According to the ninth aspect of the present invention, since the outboard side guard member is formed such that the end portion thereof extends rearwardly of the vehicle body, when the vehicle is steered, the end portion serves as a scraper that is rocked around the center of rotation of the knuckle. Consequently, the end portion can easily scrape off or break mud, snow, or the like piled up on the lower arm or can push away the piled up substance.

According to the tenth aspect of the present invention, since the outboard side guard member is formed such that the end portion thereof extends inwardly of the vehicle body, the end portion substantially coincides with the direction in which a tangential line to an arc centered at the axis of rotation of the knuckle extends. Therefore, when the vehicle is steered and the outboard side guard member is moved together with the knuckle, the end portion serves as a scraper that is rocked around the center of rotation of the knuckle. Consequently, the end portion can easily scrape off or break mud, snow, or the like piled up on the lower arm or can push away the piled up substance.

According to the eleventh aspect of the present invention, since the upright portion is provided on the inboard side guard member, the upright portion can protect a front portion and a front lower portion of the lower arm. Further, since the upright portion is disposed in the proximity of the range of movement of the end portion of the outboard side guard member, the inboard side guard member and the outboard side guard member can protect the substantially overall area of the drive shaft within the range from the center side of the vehicle body to the knuckle. Accordingly, the road ability of the vehicle can be enhanced.

According to the twelfth aspect of the present invention, since the end portion of the outboard side guard member is formed such that it overlaps with the front arm as viewed in plan when the wheel is steered in the maximum, the end portion of the outboard side guard member can certainly scrape off, break, or push away mud, snow, or the like piled up on the lower arm.

According to the thirteenth aspect of the present invention, the outboard side guard member is a member wherein a caliper guard portion for covering the brake caliper from the inner side and the end portion provided at an end portion of the caliper guard member are formed integrally with each other. Therefore, the number of parts can be reduced, and the cost of the outboard side guard member can be suppressed.

BRIEF DESCRIPTION OF THE DRAWINGS

A preferred embodiment of the present invention will be described with reference to the accompanying drawings, wherein:

FIGS. 8(a) and 8(b) are views illustrating operation of the outboard side guard member according to the present invention.

DETAILED DESCRIPTION OF THE INVENTION

Figure 1:
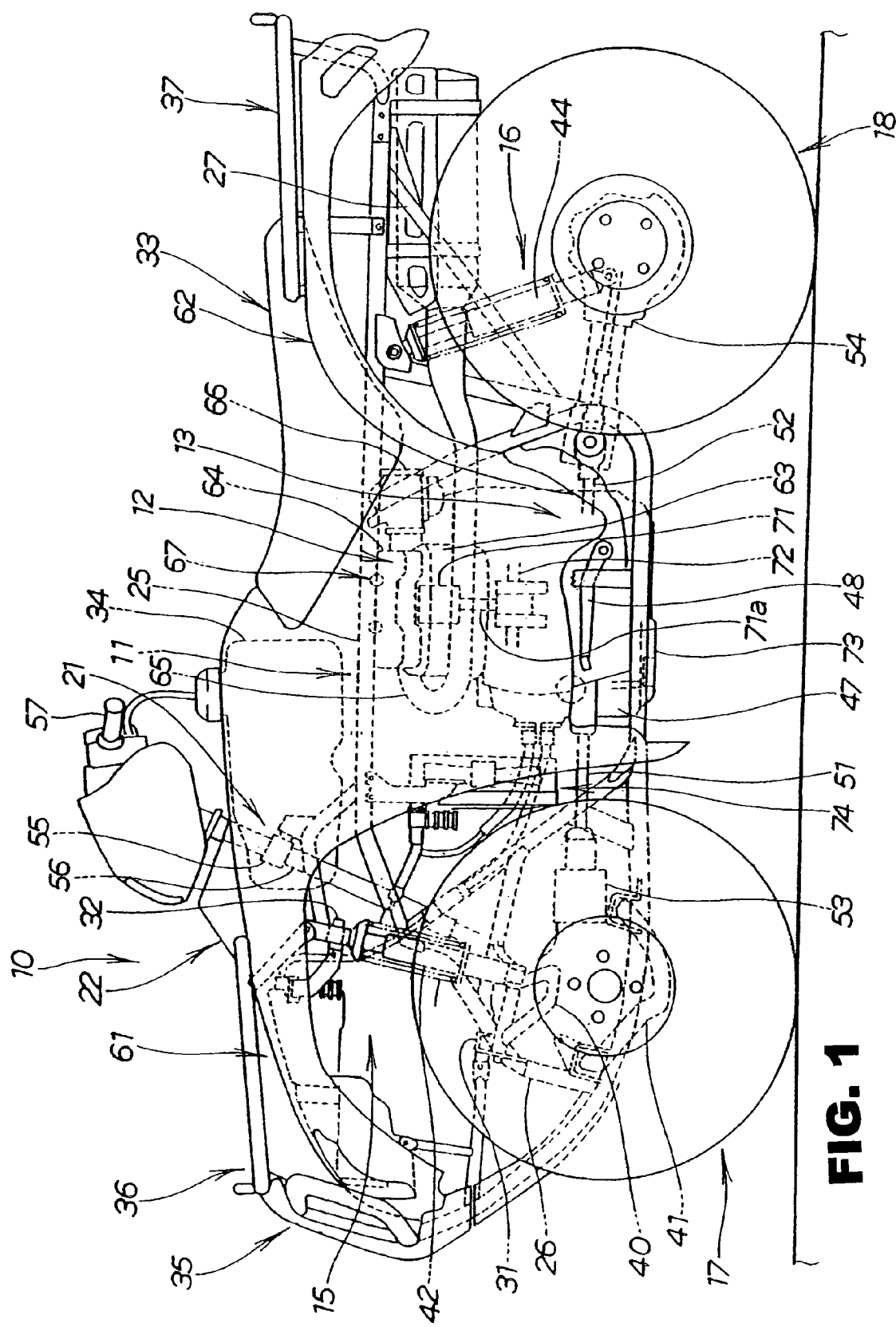
FIG. 1 is a side elevational view of an irregular ground traveling vehicle of the saddle type according to the present invention.

Embodiments of the invention will be described hereinafter with reference to the accompanying drawings. It is to be noted that the drawings should be viewed in the direction of the reference characters.

FIG. 1 is a side elevational view of a saddle ride type all-terrain vehicle (hereinafter referred to as "vehicle 10") according to the present invention. The vehicle 10 is a four-wheel driven vehicle and includes a vehicle body frame 11, and an engine 12 carried at a lower portion of a central portion of the vehicle body frame 11. The irregular ground traveling vehicle 10 further includes a transmission system 13 connected to the engine 12 and attached to the vehicle body frame 11, and a front suspension 15 and a rear suspension 16 for suspending left and right front wheels 17 and 17 (only reference numeral 17 on this side is shown) and left and right rear wheels 18 and 18 (only reference numeral 18 on this side is shown). The vehicle 10 further includes a steering apparatus 21 connected to the front wheels 17 and 17 and attached to the vehicle body frame 11.

The vehicle body frame 11 includes a main frame 25, a front frame 26, and a rear frame 27 attached to front and rear portions of the main frame 25, a bracket 31 attached between left and right portions of a lower portion of the front frame 26, and a cross member 32 attached between left and right portions of an upper portion of the front frame 26. It is to be noted that reference numeral 33 denotes a seat attached to the main frame 25, 34 a fuel tank, 35 a front guard attached to the front frame 26, 36 a front carrier attached to the front frame 26, and 37 a rear carrier attached to a rear portion of the main frame 25.

The front suspension 15 is of the left and right independent suspension type and includes a pair of left and right front upper arms 40 and 40 (only reference numeral 40 on this side is shown) and front lower arms 41 and 41 (only reference numeral 41 on this side is shown) attached for upward and downward rocking motion on the vehicle body frame 11. The front suspension 15 further includes a pair of left and right front cushion units 42 and 42 (only reference numeral 42 on this side is shown) attached between the front upper arms 40 and 40 and the cross member 32, respectively.

The rear suspension 16 includes a rear cushion unit 44 attached to the vehicle body frame 11.

The transmission system 13 includes a transmission 47 connected to an output power shaft of the engine 12, a gear change pedal 48, and a front drive shaft 51 and rear drive shaft 52 connected to the front and rear of the transmission 47. The transmission system 13 further includes a front final reduction gear 53 connected to the front drive shaft 51 and attached to the vehicle body frame 11 side, and a rear final reduction gear 54 connected to the rear drive shaft 52.

The steering apparatus 21 includes a steering shaft 56 attached to a front upper portion of the main frame 25 by means of a shaft holder 55, and a handle bar 57 attached to the steering shaft 56. It is to be noted that reference numeral 61 denotes a front fender for covering the front wheels 17 and 17 from above, and 62 a rear fender for covering the rear wheels 18 and 18 from above.

The engine 12 is a four-cycle engine and includes a cylinder block 63, a cylinder head 64 attached to an upper portion of the cylinder block 63, and an exhaust system 65 connected to a front portion of the cylinder head 64. The engine 12 further includes a carburetor 66 attached to a rear portion of the cylinder head 64, a valve system 67 provided in the cylinder head 64, and a piston 71 inserted for movement in the cylinder block 63. The engine 12 further includes a crankshaft 72 connected to the piston 71 through a connecting rod 71a, an oil pan 73 disposed below the cylinder block 63, and a cooling fan 74 disposed forwardly of the engine 12 for compulsorily air cooling the engine 12.

Figure 2:
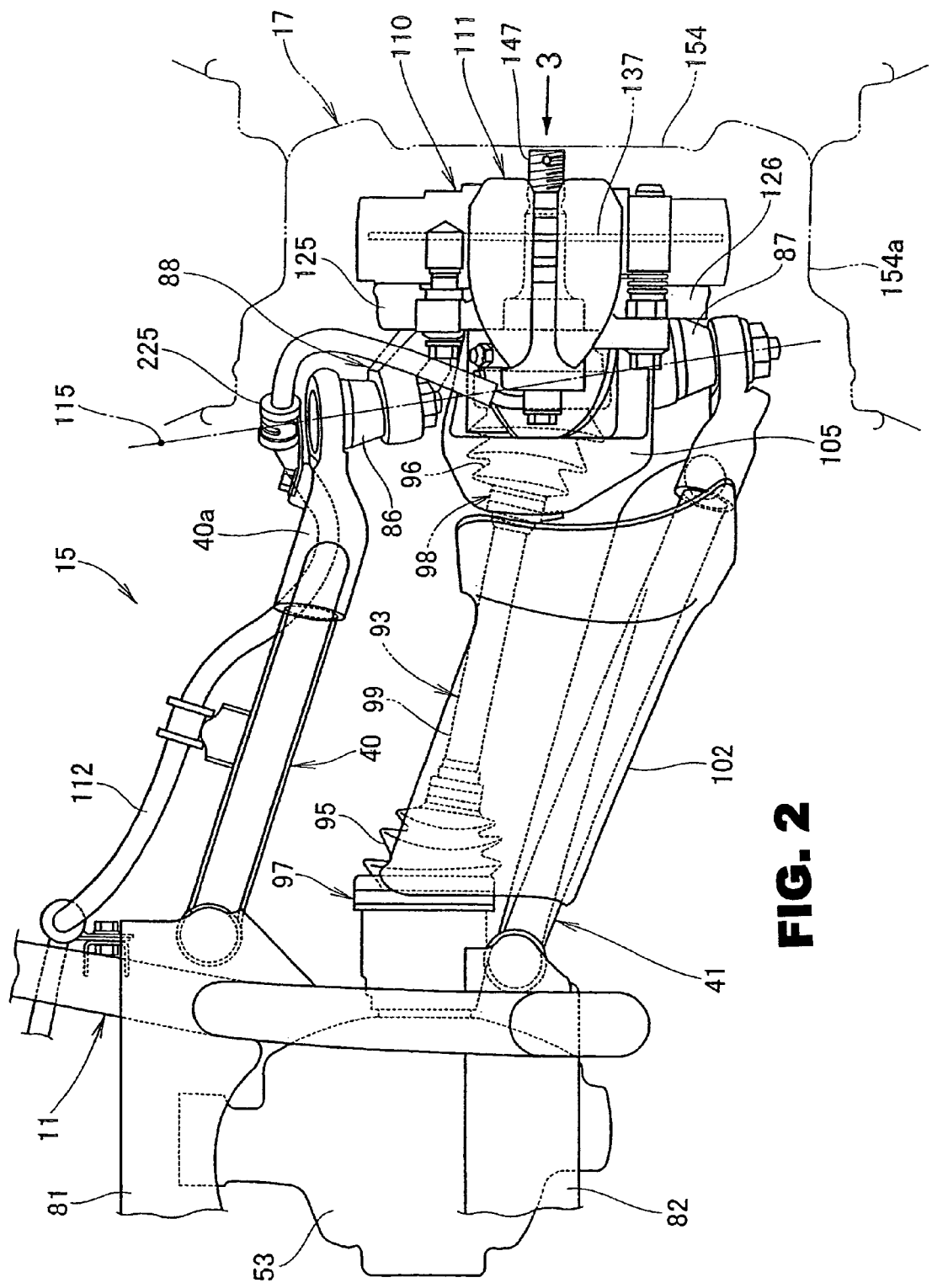
FIG. 2 is a front elevational view of part of a front suspension of the irregular ground traveling vehicle according to the present invention.

FIG. 2 is a front elevational view of part of the front suspension of the irregular ground traveling vehicle according to the present invention. Here, only a portion of the front suspension 15 at which the left side front wheel 17 is suspended is shown, and description of another portion of the front suspension 15 at which the right side front wheel 17 is suspended is omitted.

The front suspension 15 includes three arm supporting portions 81, 82, and 82 (the arm supporting portion 82 disposed on the interior side is not shown) extending leftwardly and rightwardly at a front portion of the vehicle body frame 11. The front suspension 15 further includes the above described front upper arm 40 attached for upward and downward swinging motion at end portions of the arm supporting portions 81 and 81 and the above described front lower arm 41 attached for upward and downward swinging motion at end portions of the arm supporting portions 82 and 82. The front suspension 15 further includes a knuckle 88 connected to ends of the front upper arm 40 and the front lower arm 41 through ball joints 86 and 87, respectively, and a front cushion unit 42 (refer to FIG. 1) extending between the vehicle body frame 11 and the front upper arm 40. A front wheel 17 is attached to the hub.

The knuckle 88 includes a first arm 125 and a second arm 126, and a brake caliper 111 of a disk brake apparatus 110 is attached to the first arm 125 and the second arm 126.

The disk brake apparatus 110 includes a brake disk 137, which is attached to the hub, and the above described brake caliper 111 for sandwiching the brake disk 137 to brake the brake disk 137. The disk brake apparatus 10 is of the so-called wheel-in type to be accommodated fully in a wheel disc 154, which forms the front wheel 17.

Here, the front final reduction gear 53 is connected to an end of the front drive shaft 51 (refer to FIG. 1) extending forwardly from a lower portion of the transmission 47 (refer to FIG. 1). The front final reduction gear 53 transmits power from the front final reduction gear 53 to the hub through a drive shaft 93 to drive the front wheel 17.

Reference numerals 95 and 96 denote rubber boots for covering universal speed joints 97 and 98 provided at the opposite end portions of the drive shaft 93. The rubber boot 95 and a shaft 99 extending between the universal speed joints 97 and 98 are covered from forwardly and from forwardly obliquely downwardly with an inboard side guard member 102 attached to the front lower arm 41. The other rubber boot 96 is covered from forwardly with an outboard side guard member 105 attached to the knuckle 88.

Reference numeral 112 in FIG. 2 denotes a brake hose extending between a master cylinder (not shown) provided on the handle bar 57 (refer to FIG. 1) side and the brake caliper 111. The brake hose 112 is secured at intermediate portions thereof to the front upper arm 40 and the vehicle body frame 11. Particularly, one of the fixed portions of the brake hose 112 (specifically, a third bracket 225 hereinafter described) is disposed on a king pin axis 115 interconnecting between the ball joints 86 and 87 above an end portion 40a of the front upper arm 40.

Figure 3:
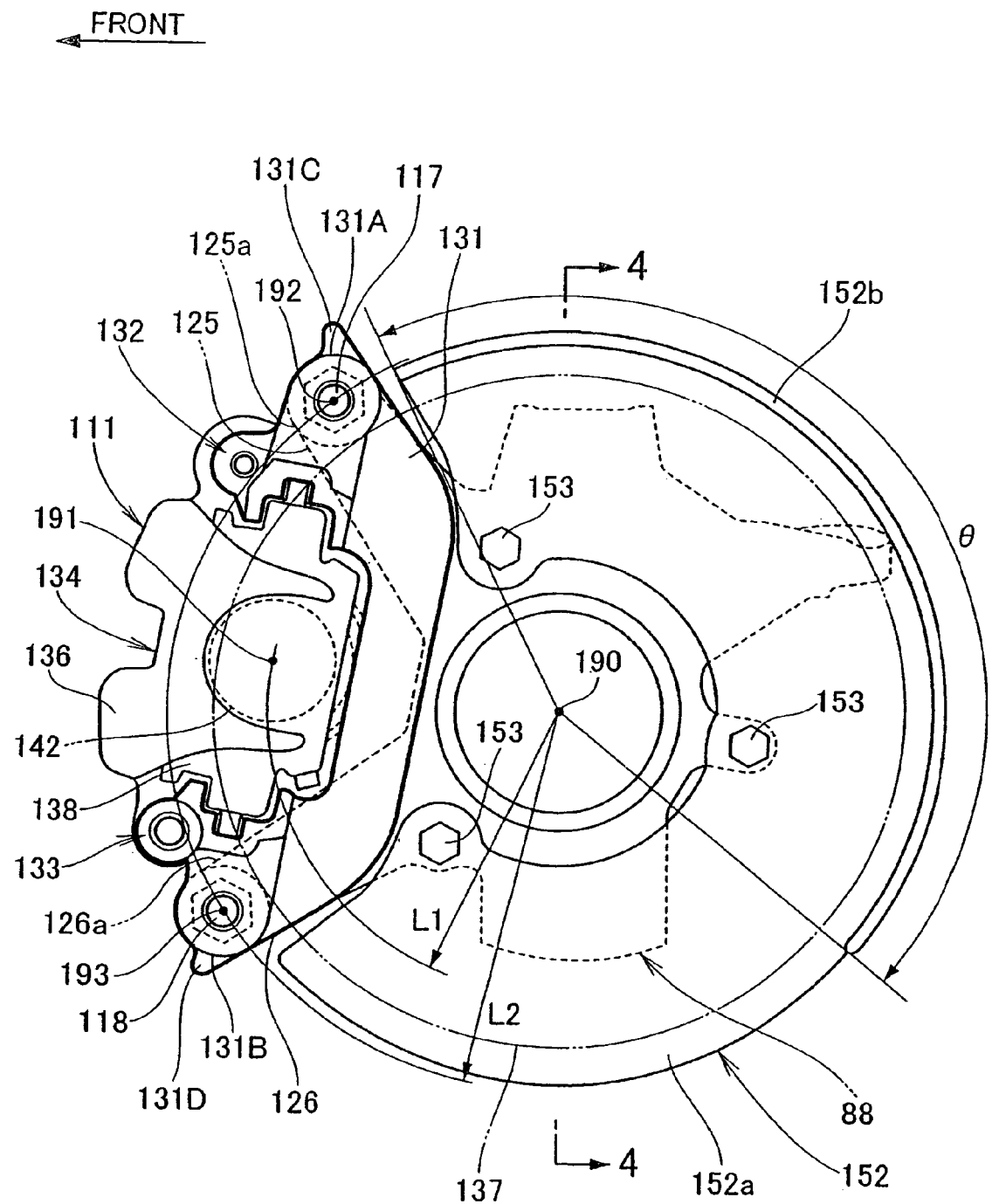
FIG. 3 is a view as viewed in the direction indicated by an arrow mark 3 of FIG. 2.

FIG. 3 is a view as viewed in the direction of an arrow mark of FIG. 2 (an arrow mark (FRONT) in the figure represents the forward direction of the vehicle: this similarly applies to the succeeding figures). FIG. 3 shows that the brake caliper 111 is attached to the first arm 125 and the second arm 126 provided on the knuckle 88 (more particularly, a first caliper supporting portion 125a provided at an end portion of the first arm portion 125 and a second caliper supporting portion 126a provided at an end portion of the second arm portion 126) by means of bolts 117 and 118.

The brake caliper 111 includes a caliper bracket 131 (a portion whose contour is indicated by a thick line) attached to the first arm 125 and the second arm 126, and a caliper assembly 134 connected to the caliper bracket 131 through a first connecting portion 132 and a second connecting portion 133.

Here, reference character 131A denotes a first attachment portion provided on the caliper bracket 131 for attaching the caliper bracket 131 to the first caliper supporting portion 125a of the first arm 125. Meanwhile, reference character 131B denotes a second attachment portion provided on the caliper bracket 131 for attaching the caliper bracket 131 to the second caliper supporting portion 126a of the second arm 126.

The caliper assembly 134 includes a caliper body 136 connected to the caliper bracket 131, a pair of pads 138 and 141 (only reference numeral 138 on this side is shown) disposed on the inner side of the caliper body 136 for sandwiching the brake disk 137 from the opposite sides, and a piston 142 accommodated for movement in the caliper body 136 for pressing the pads 138 and 141.

Where the center of the front wheel 17 (refer to FIG. 1) is represented by a point 190, the center of the piston 142 by a point 191, the axial line of the bolt 117 by a point 192, the axial line of the bolt 118 by point 193, the distance from the point 190 to the point 191 by L1, and the distance from the point 190 to a point 192 (or another point 193) by L2, the distance L2 is greater than the distance L1 (L2>L1). In other words, the bolts 117 and 118 for attaching the brake caliper 111 to the knuckle 88 are disposed on the outer side in a radial direction with respect to the center of the piston 142. Consequently, when brake torque upon braking acts upon the pads 138 and 141 (more particularly, the positions of the pads 138 and 141 corresponding to the position of the center of the piston 142), the load generated upon the bolts 117 and 118 can be reduced.

Figure 4:
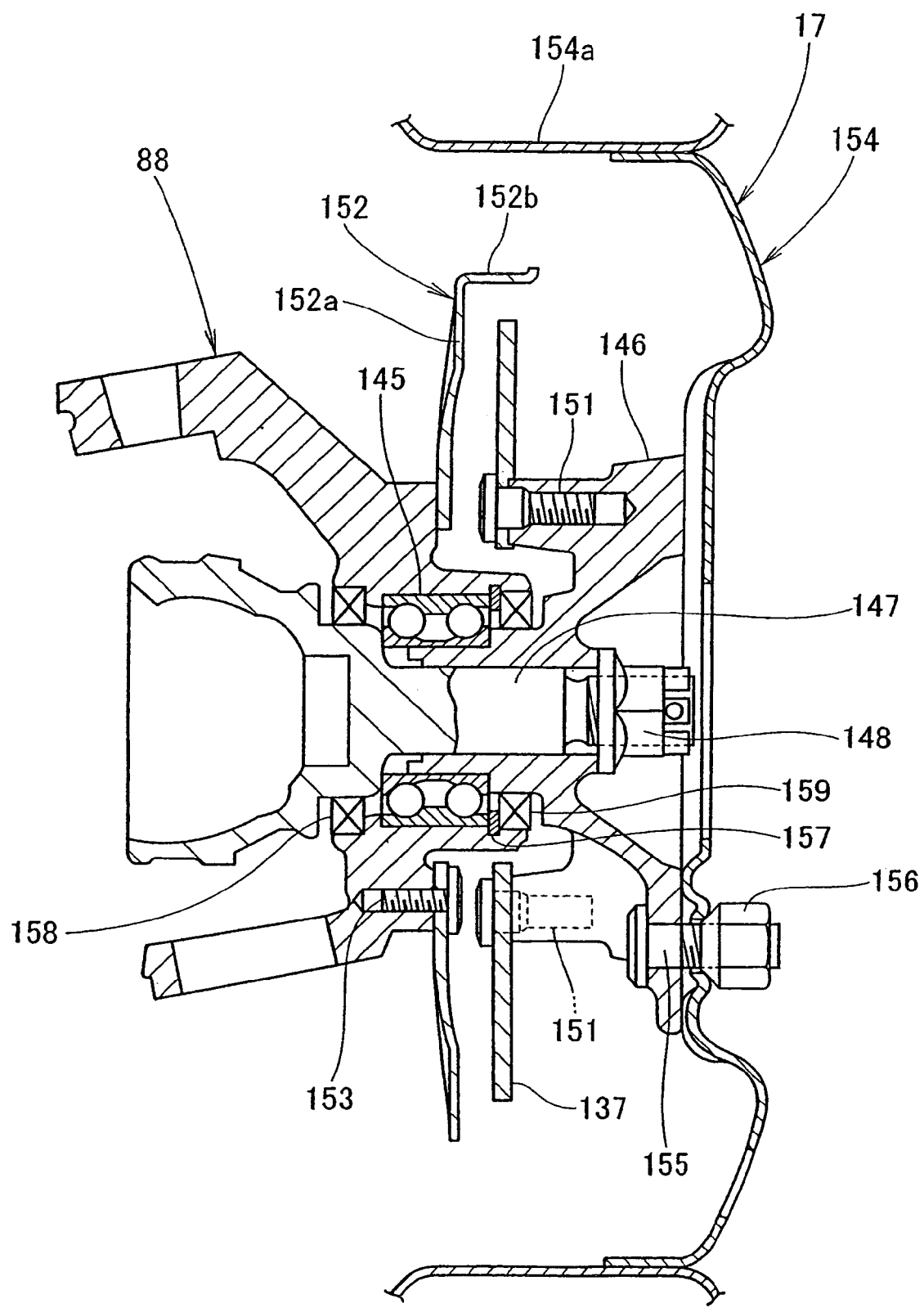
FIG. 4 is a sectional view taken along line 4-4 of FIG. 3.

FIG. 4 is a sectional view taken along line 4-4 of FIG. 3 and shows that a hub 146 is rotatably attached to the knuckle 88 through a bearing 145, and a axle 147 provided integrally on the equal speed joint 98 (refer to FIG. 2) is spline-coupled and attached to the inner side of the hub 146 by means of a nut 148. Further, the brake disk 137 is attached to the hub 146 by means of a plurality of bolts 151, and a cover member 152 is attached to the knuckle 88 by means of a plurality of bolts 153 in order to cover the brake disk 137 from the inward direction. It is to be noted that reference character 154 denotes a wheel disc attached to the hub 146 by means of a plurality of bolts 155 and a plurality of nuts 156, 154a a rim of the wheel disc 154, 157 a snap ring, and reference numerals 158 and 159 denote dust seals.

The cover member 152 includes a disk portion 152a extending radially outwardly and a flange portion 152b provided at part of an outer circumferential edge of the disk portion 152a. Referring back to FIG. 3, the cover member 152 is a member whose flange portion 152b is provided at a portion other than the circumferential edge of the lower portion of the 152a, that is, an outer circumferential edge of an upper portion and an outer circumferential edge of a rear portion of the disk portion 152a (more specifically, within a range of an angle θ).

Figure 5:
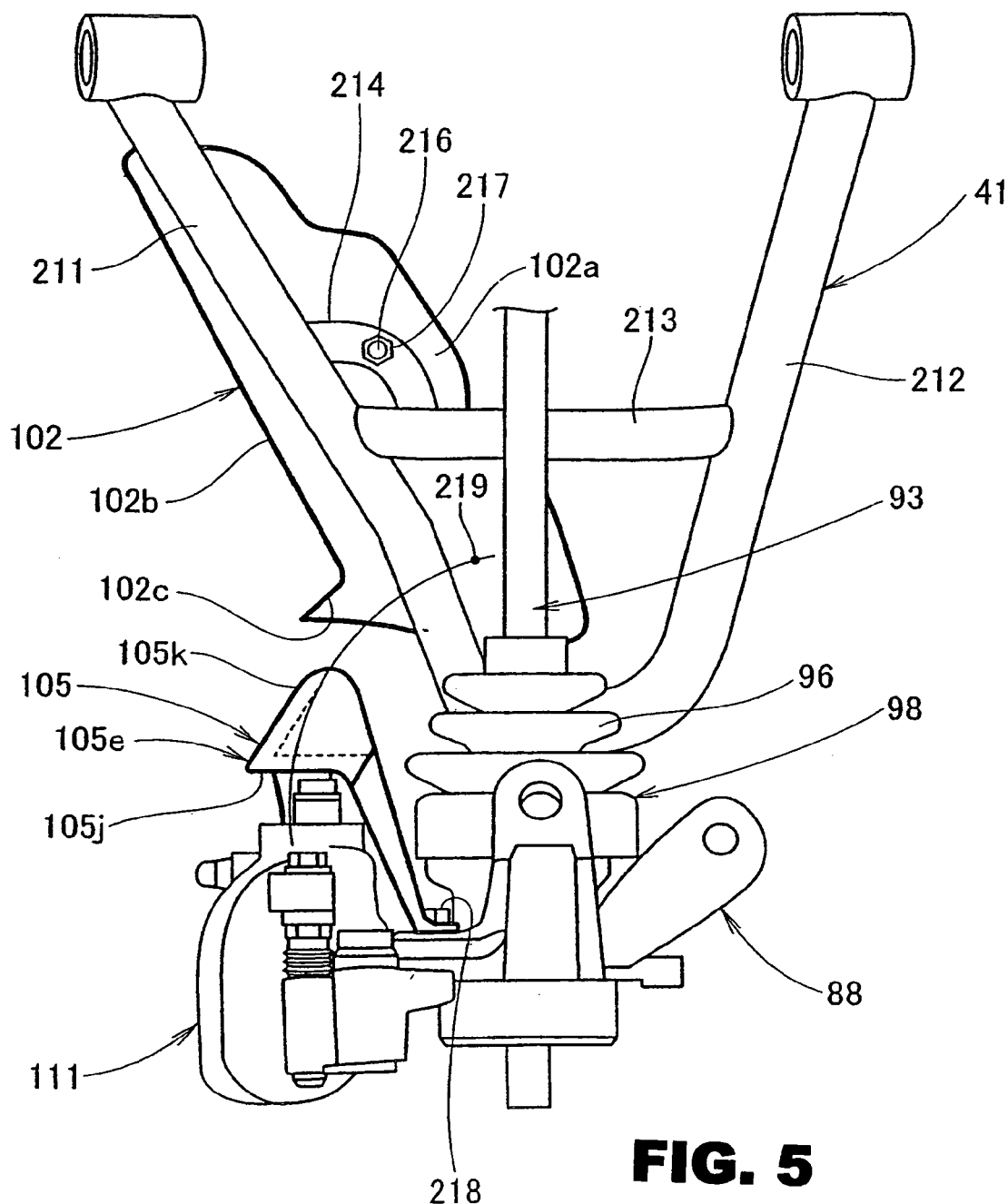
FIG. 5 is a plan view showing an inboard side guard member and an outboard side guard member according to the present invention in an attached state.

FIG. 5 is a plan view showing the inboard side guard member and the outboard side guard member according to the present invention in an attached state. The front lower arm 41 is formed from a front arm 211, a rear arm 212 disposed rearwardly of the front arm 211, and a cross member 213 extending between the front arm 211 and the rear arm 212. A bracket 214 extends between and is attached to the front arm 211 and the cross member 213, and the inboard side guard member 102 (part of which is indicated by a thick line) is attached to the bracket 214 by means of a bolt 216 and a nut 217. The outboard side guard member 105 (part of which is indicated by a thick line) is attached to the knuckle 88 by means of bolts 218 and 218 (only one reference numeral 218 is shown).

The inboard side guard member 102 includes a base portion 102a, which covers the front arm 211 from below, and an upright portion 102b formed integrally with the base portion 102a in such a manner as to extend upwardly from a front edge of the base portion 102a. Therefore, the inboard side guard member 102 can protect the rear arm 212 and the cross member 213 in addition to the front arm 211 from a flying stone or a colliding article from forwardly of the vehicle.

Reference character 102c in FIG. 5 denotes an outer edge portion of the inboard side guard member 102 on the sideward side of the vehicle. The outer edge portion 102c is a portion provided at a position outside a range of movement of a second guard portion 105e provided on the free end side of the outboard side guard member 105.

Further, the outboard side guard member 105 can protect not only the equal speed joint 98 and the rubber boot 96 of the drive shaft 93 from a flying stone or a colliding article from forwardly of the vehicle but also the brake caliper 111 from mud water and so forth from rearwardly of the vehicle.

Figure 6:
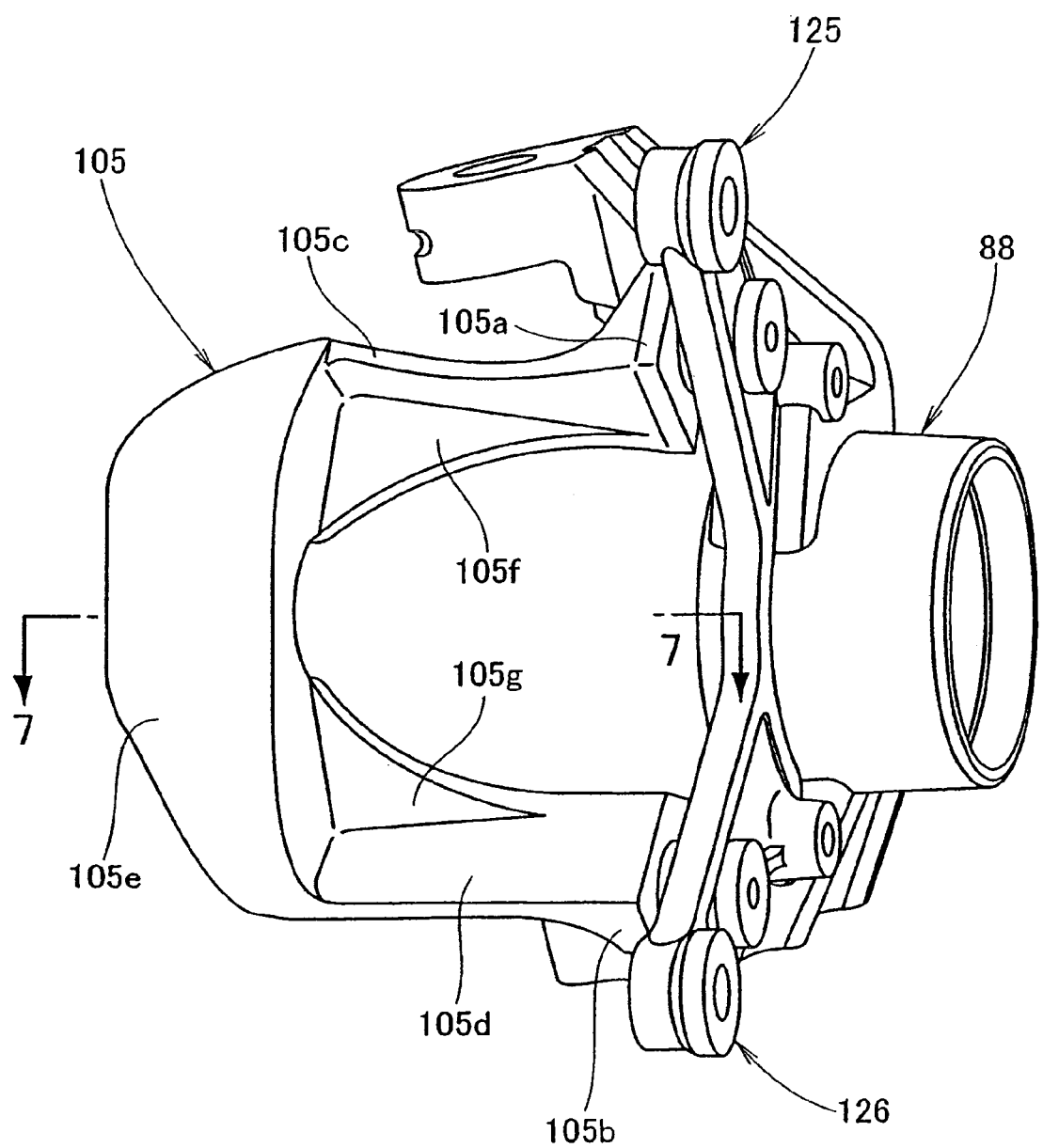
FIG. 6 is a perspective view showing the outboard side guard member according to the present invention in the attached state.

FIG. 6 is a perspective view of the outboard side guard member according to the present invention in an attached state. The outboard side guard member 105 is a member to integrally form attachment portions 105a, 105b to be attached to the knuckle 88, first guard portions 105c, 105d extending substantially in parallel to each other from the attachment portions 105a, 105b, and a second guard portion 105e connecting ends of the first guard portions 105c, 105d to each other. It is to be noted that reference character 105f denotes an auxiliary guard portion provided integrally to a connection portion between the first guard portion 105c and the second guard portion 105e, and 105g an auxiliary guard portion provided integrally to a connection portion between the first guard portion 105d and the second guard portion 105e.

Figure 7:
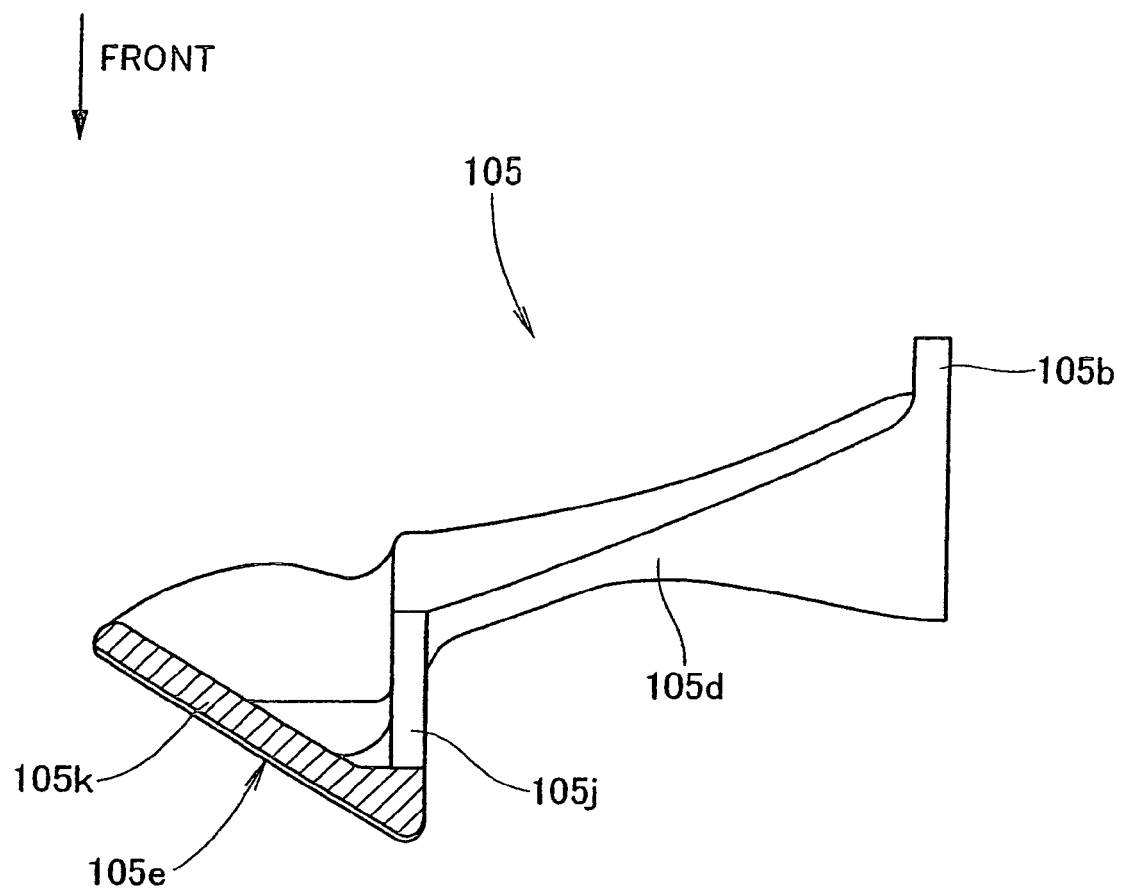
FIG. 7 is a sectional view taken along line 7-7 of FIG. 6.

FIG. 7 is a sectional view taken along line 7-7 of FIG. 6. The second guard portion 105e of the outboard side guard member 105 includes a base portion 105j extending substantially in a forward and backward direction of the vehicle, and an inclined portion 105k extending rearwardly obliquely inwardly (inward location is the center side of the vehicle, and the leftward in the figure) from a front end portion of the base portion 105j.

Referring back to FIG. 5, the inclined portion 105k of the outboard side guard member 105 is extended inwardly obliquely rearwardly so as to coincide substantially with the direction in which a tangential line to an arc 219 drawn around the center provided by the king pin axis 115 (refer to FIG. 2), which is the center of rotation of the knuckle 88, extends.

Operation of the outboard side guard member 105 described above is described below.

FIGS. 8(a) and 8(b) are views illustrating operation of the outboard side guard member according to the present invention. It is to be noted that the outboard side guard member 105 is partly indicated by a thick line.

Referring to FIG. 8(a), for example, snow is sometimes piled up on the front lower arm 41 to form a mass 202 (or a clod of mud or the like) and freezes on the front lower arm 41.

Referring to FIG. 8(b), if the vehicle is steered by a maximum amount as indicated by an arrow mark A, then the outboard side guard member 105 moves together with the knuckle 88 to a position at which it overlaps with the front arm 211 of the front lower arm 41 and pushes the mass 202 away from a position indicated by an imaginary line (position shown in FIG. 8(a)) as indicated by an arrow mark B.

Alternatively, since the inclined portion 105k of the outboard side guard member 105 extends substantially in a tangential direction to the arc 219 as described hereinabove with reference to FIG. 5, when the vehicle is steered, the outboard side guard member 105 serves as a scraper and breaks or scrapes off the mass 202 in FIG. 8(b).

Figure 9:
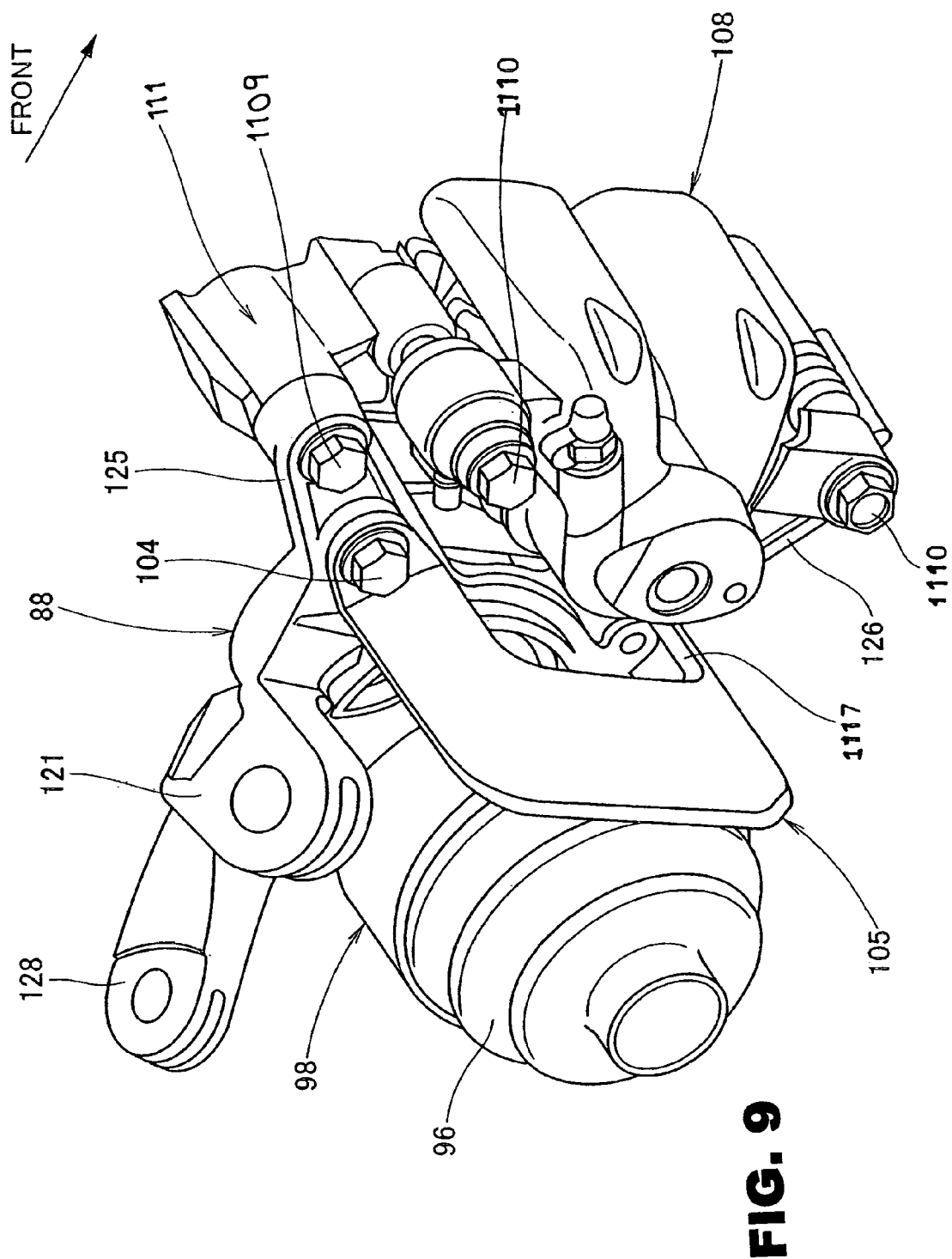
FIG. 9 is a perspective view showing a protector for a vehicle according to the present invention.

FIG. 9 is a perspective view showing a protector for a vehicle according to the present invention (the forward direction of the vehicle is indicated by an arrow mark (FRONT): this similarly applies to the succeeding figures). FIG. 9 shows that the outboard side guard member 105 as the front wheel side protector and a caliper bracket 111 are attached to the first arm 125 and the second arm 126 of the knuckle 88, and a brake caliper 108 is attached to the caliper bracket 111. It is to be noted that reference numerals 1109 and 1109 (only one of the reference numerals 1109 is shown) denote bolts for attaching the caliper bracket 107 to the knuckle 88, and 1110 and 1110 denote bolts for attaching the brake caliper 108 to the caliper bracket 107.

The outboard side guard member 105 is a member for covering the rubber boot 96 from forwardly and has a cutaway portion 1117 provided thereon for preventing interference of the outboard side guard member 105 with the brake caliper 111.

Figure 10:
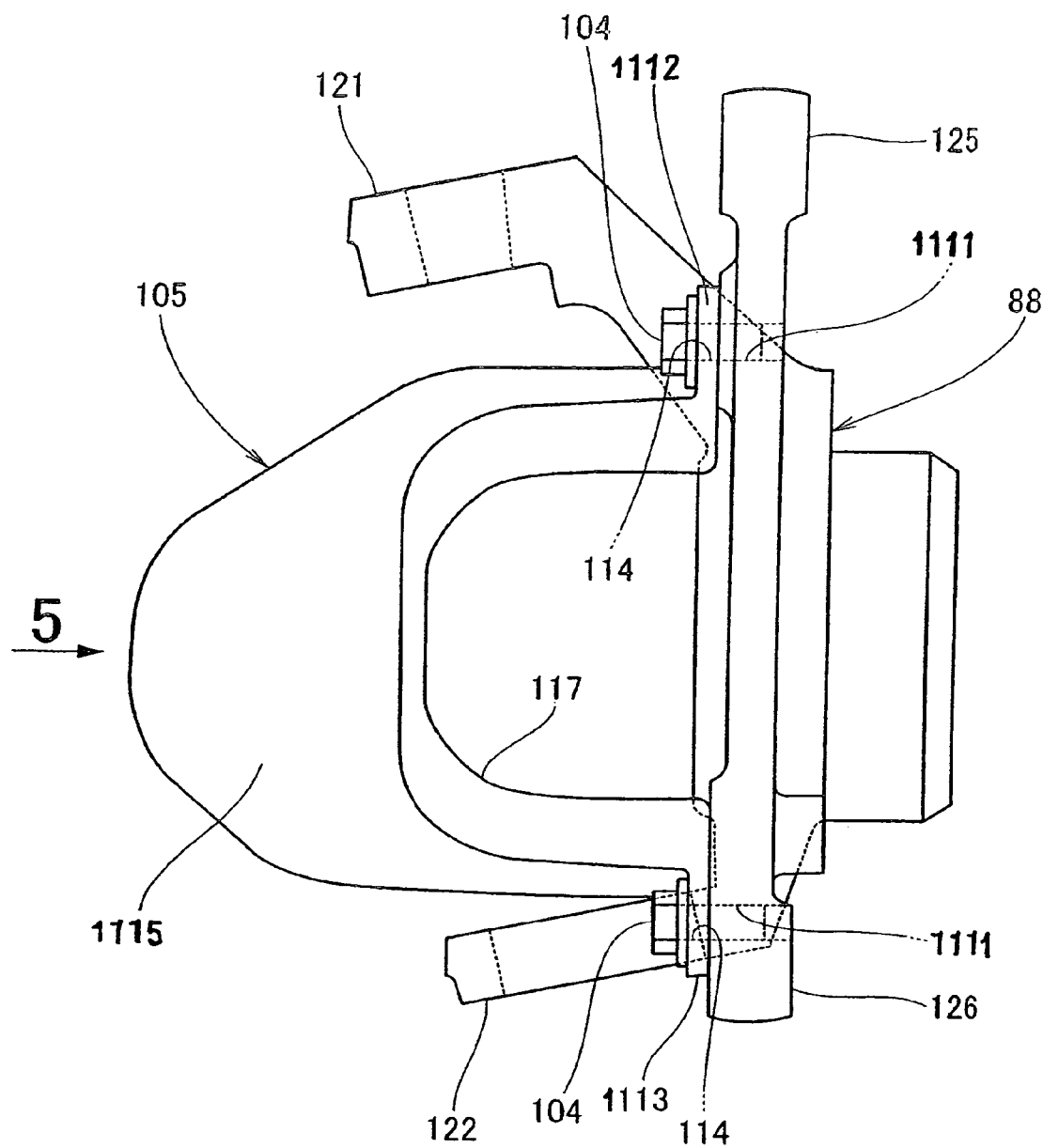
FIG. 10 is a front elevational view showing an outer side guard member attachment structure of the vehicle according to the present invention.

FIG. 10 is a front elevational view showing an outboard side guard member attachment structure according to the present invention. Female threads 1111 and 1111 are formed on the first arm 125 and the second arm 126 of the knuckle 88, and bolt fitting holes 114 and 114 are formed in flange portions 1112 and 1113 formed on the outer side guard member 105. The bolts 104 and 104 are fitted into the bolt fitting holes 114 and 114 and screwed into the female threads 111 and 111 to attach the outboard side guard member 105 to the knuckle 88.

The outboard side guard member 105 includes a boot covering portion 1115 for covering the rubber boot 96 (refer to FIG. 2), the cutaway portion 1117 cut away in a substantially channel shape, and the aforementioned flange portions 1112 and 1113 formed integrally on the boot covering portion 1115. It is to be noted that reference numeral 121 denotes an upper arm connecting portion provided on the knuckle 88 for connecting the knuckle 88 to the upper arm and a lower arm connecting portion provided on the knuckle 88 for connecting the knuckle 88 to the lower arm.

Figure 11:
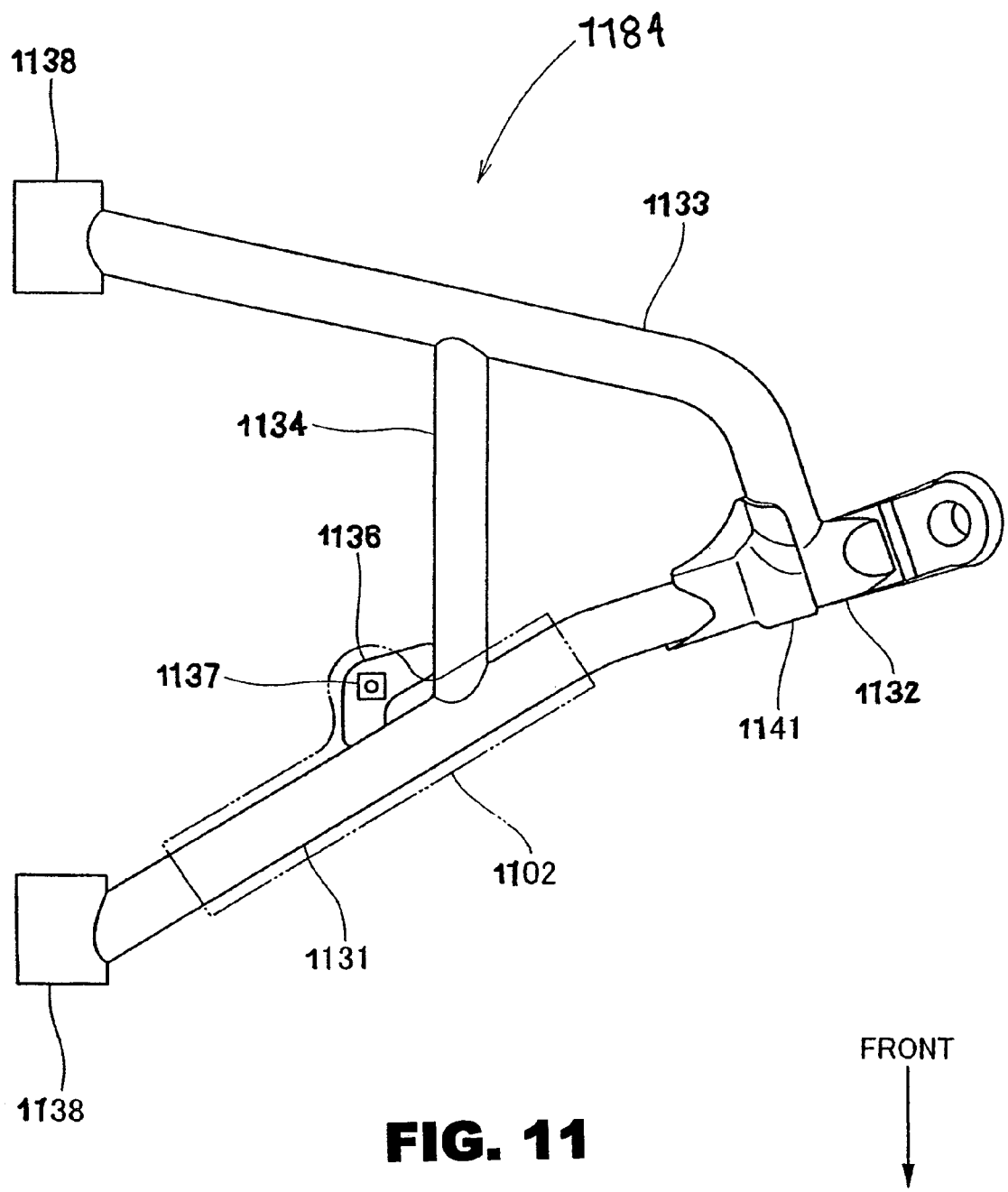
FIG. 11 is a plan view of a lower arm according to the present invention.

FIG. 11 is a plan view of the lower arm according to the present invention. The lower arm 1184 includes a substantially straight front pipe 1131, and a bracket 1132 attached to an end of the front pipe 1131 for connecting the lower arm 1184 to the knuckle 88 (refer to FIG. 2). The lower arm 84 further includes a rear pipe 1133 connected in a bent form to a rear portion of the bracket 1132, and a cross pipe 1134 extending between the front pipe 1131 and the rear pipe 1133. A bracket 1136 is attached such that it spans the front pipe 1131 and the cross pipe 1134, and a nut 1137 is attached to the bracket 1136. A bolt is screwed into the nut 1137 to attach the inboard side guard member 102 (refer to FIG. 2) to the bracket 1136 from below. It is to be noted that reference numerals 1138 and 1138 denote arm side attachment portions for attaching the lower arm 1184 to the arm supporting portions 82 (refer to FIG. 2), and reference numeral 1141 denotes a reinforcement plate for reinforcing the connecting portion between the bracket 1132 and the rear pipe 1133.

As shown in the figure, since the inboard side guard member 102 is disposed such that it extends along the front side of the front pipe 1131 from below, the inboard side guard member 102 can be prevented from turning by the front pipe 1131 and can be secured to the lower arm 1184 only by means of the bolts and nuts 1137 in pair. Consequently, reduction of the cost by reduction of the number of parts can be achieved.

Operation of the outer side guard member 105, according to one embodiment, is described below.

Figure 12A:
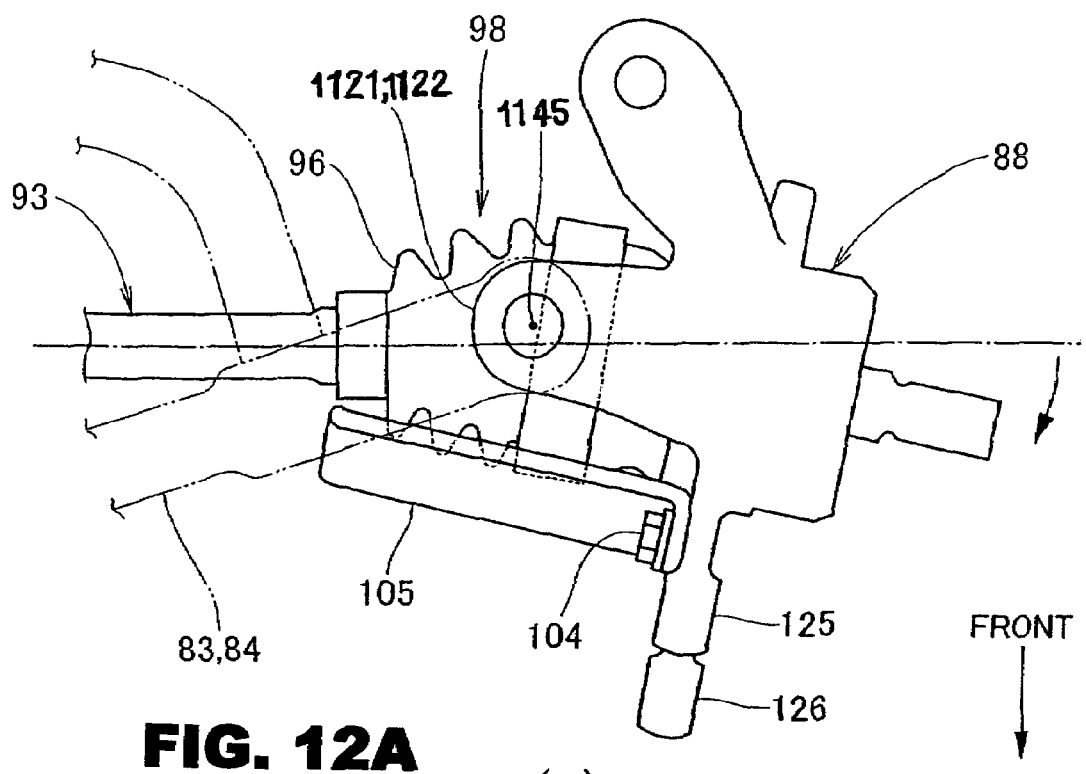
FIGS. 12(a) and 12(b) are views illustrating operation of the outer side guard member of the vehicle according to the present invention.
Figure 12B:
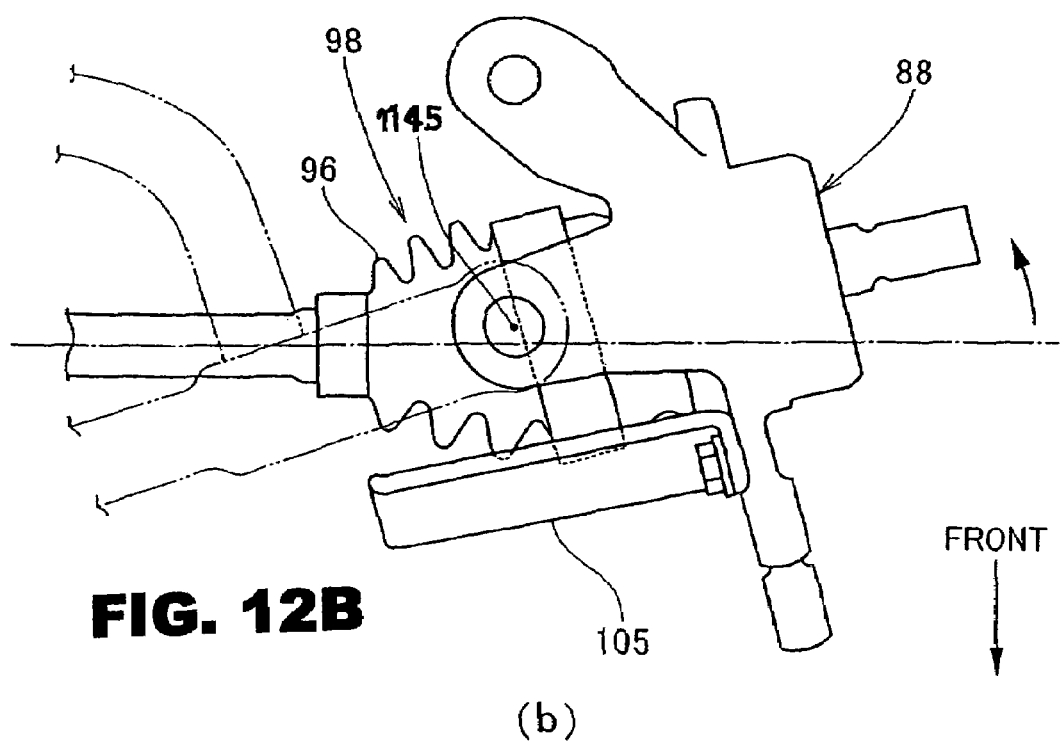

FIGS. 12(a) and 12(b) are views illustrating operation of the outboard side guard member according to one embodiment of the present invention.

Referring to FIG. 12(a), for example, if the handle bar is operated for turning to the right and the knuckle 88 is swung in a direction indicated by an arrow mark around a support shaft 1145 (here, the support shaft 1145 is represented by a dot) provided on the upper arm connecting portion 1121 and the lower arm connecting portion 1122, then the outboard side guard member 105 moves toward the rubber boot 96 while it covers the front side of the rubber boot 96.

Referring to FIG. 12(b), for example, if the handle bar is operated for turning to the left and the knuckle 88 is swung in a direction indicated by an arrow mark around the support shaft 1145, then the outer side guard member 105 moves away from the rubber boot 96 while it covers the front side of the rubber boot 96. However, the distance by which the outboard side guard member 105 moves away from the rubber boot 96 is smaller than that where a guard member is attached to a suspension arm as in the conventional art.

Figure 13:
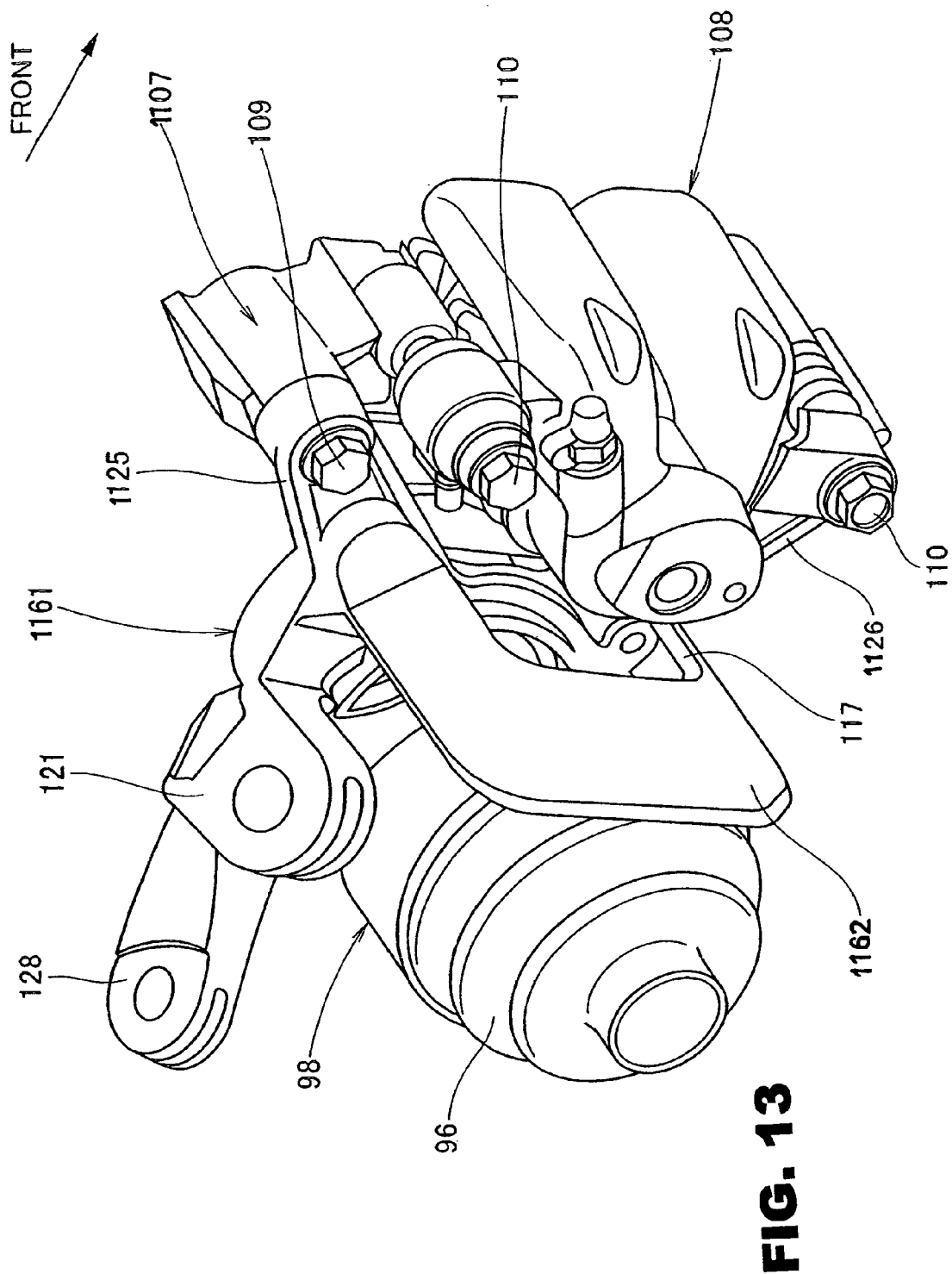
FIG. 13 is a perspective view showing another embodiment of the protector for a vehicle according to the present invention.
Figure 14:
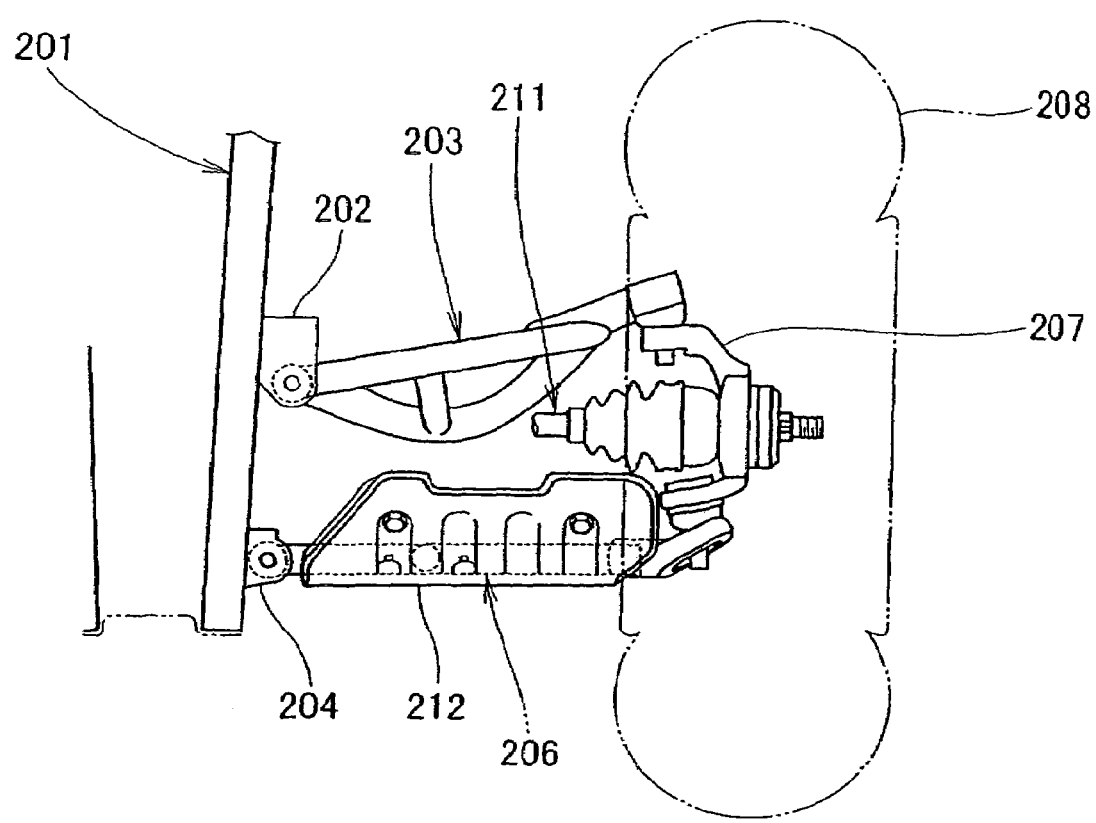
FIG. 14 is a front elevational view of a conventional protector for an irregular ground traveling vehicle of the saddle type.

FIG. 13 is a perspective view showing another embodiment of the protector for a vehicle according to the present invention. In FIG. 13, like elements to those in the embodiment of FIG. 9 are denoted by like reference characters, and detailed description of them is omitted herein.

A knuckle 161 for supporting the front wheel for rotation thereon through a hub integrally includes an outboard side guard portion 1162. The outer side guard portion 1162 is attached to the first and second arms 1125 and 1126 as a front wheel side protector. The caliper bracket 1107 is attached to the first arm 1125 and the second arm 1126, and the brake caliper 108 is attached to the caliper bracket 111. The rubber boot 96 is covered from forwardly with the outboard side guard portion 1162.

Since the outboard side guard portion 1162 for protecting the rubber boot 96 is formed integrally on the knuckle 1161 in this manner, the number of parts can be reduced and the cost can be reduced.

It is to be noted that, while, in the present embodiment, the rubber boot 95 is covered from forwardly with the inboard side guard member 102 and the rubber boot 96 is covered from forwardly with the outer side guard member 105, the configuration is not limited to this. In particular, also the forward obliquely downward portion of the rubber boot 95 and the lower portion of the rubber boot 95 may be covered with the inner side guard member 102, and the forward obliquely downward portion of the rubber boot 96 and the lower portion of the rubber boot 96 may be covered with the outer side guard member 105.

Further, while the rubber boot 95 and the shaft 153 are covered from forwardly with the inner side guard member 151 as shown in FIG. 9, the configuration is not limited to this, and also the forward obliquely downward portion of the rubber boot 95 and the shaft and the lower portion of the rubber boot 95 and the shaft may be covered with the inner side guard member.

As described above with reference to FIGS. 2 and 5, according to ninth and tenth aspect of the present invention, in a guard member for an irregular ground traveling vehicle 10 (refer to FIG. 1) of the saddle type, a disk brake apparatus 110 including a brake disk 137 and a brake caliper 111 for sandwiching the brake disk 137 to brake the brake disk 137 is disposed on the inner side of a wheel disc 154 of each of left and right front wheels 17 and 17. An independent suspension system wherein each of the left and right front wheels 17 and 17 is supported by a front upper arm 40 as an upper arm and a front lower arm 41 as a lower arm is adopted. An inboard side guard member 102 is attached to the front lower arm 41 in order to protect a drive shaft 93, which transmits driving force to the front wheels 17, on the center side of a vehicle body from forwardly while an outboard side guard member 105 is attached to a knuckle 88 in order to protect the drive shaft 93 on the front wheel 17 side from forwardly. The outboard side guard member 105 is formed such that a second guard portion 105e as an end portion thereof, more particularly an inclined portion 105k, extends inwardly obliquely rearwardly of the vehicle body.

The outboard side guard member 105 is formed such that the second guard portion 105e thereof extends inwardly obliquely rearwardly of the vehicle body. Therefore, when the vehicle is steered to move the outboard side guard member 105 together with the knuckle 88, the second guard portion 105e serves as a scraper and can easily scrape off, break, or push away mud, snow, or the like piled up on the front lower arm 41. Accordingly, cumbersome removal of mud, snow, and so forth by manual operation as in the conventional art can be eliminated.

According to eleventh aspect of the present invention, the inboard side guard member 102 covers a front portion and a front lower portion of the front lower arm 41 and includes an upright portion 192b disposed in the proximity of a range of movement of the second guard portion 105e of the outboard side guard member 105.

Since the upright portion 102b is provided on the inboard side guard member 102, the upright portion 102b can protect a front portion and a front lower portion of the front lower arm 41. Further, the upright portion 102b is disposed in the proximity of the range of movement of the second guard portion 105e of the outboard side guard member 105. Thus, the inboard side guard member 102 and the outboard side guard member 105 can protect the substantially overall area of the drive shaft 93 within the range from the center side of the vehicle body to the knuckle 88. Accordingly, the driving ability of the irregular ground traveling vehicle 10 of the saddle type can be enhanced.

According to the twelfth aspect of the present invention, the front lower arm 41 includes a front arm 211 provided on the front side of the vehicle and a rear arm 212 provided rearwardly of the front arm 211, and the second guard portion 105e of the outboard side guard member 105 overlaps with the front arm 211 as viewed in plan when the front wheels 17 are steered in the maximum.

Since the second guard portion 105e of the outboard side guard member 105 is formed such that it overlaps with the front arm 211 as viewed in plan when the front wheel 17 is steered in the maximum, the second guard portion 105e of the outboard side guard member 105 can certainly scrape off, break, or pushed away mud, snow, or the like piled up on the front lower arm 41.

According to the thirteenth aspect of the present invention, the outboard side guard member 105 is a member wherein a first guard portion 105c, 105d as a caliper guard portion for covering the brake caliper 111 from the inner side and the second guard portion 105e provided at an end portion of the first guard portion 105c, 105d are formed integrally with each other.

Since the first guard portions 105c, 105d and the second guard portion 105e are formed integrally with each other, the number of parts can be reduced and the cost of the outboard side guard member 105 can be suppressed.

It is to be noted that, while the inclined portion 105k of the outboard side guard member 105 in the present embodiment is formed such that the cross section thereof extends substantially linearly as shown in FIG. 7, the shape of the cross section is not limited to this, but it may otherwise extend arcuately along the arc 219 shown in FIG. 5.

Further, although the end portion of the outboard side guard member 105 is formed such that it extends inwardly obliquely rearwardly of the vehicle body, the direction of the end portion of the outboard side guard member 105 is not limited to this, but it may otherwise be formed so as to extend rearwardly of the vehicle body or inwardly of the vehicle body.

We claim:

1. A saddle ride type all-terrain vehicle having left and right front wheels supported independently of each other on a vehicle body such that driving power is transmitted to said front wheels by way of a pair of left and right drive shafts extending from a driving source side, said vehicle comprising:
   a first and second universal coupling provided at opposite end portions of each of said drive shafts;
   a first and second rubber boot covering each of said universal couplings; and
   a protector covering each of said rubber boots, said protector comprising an inboard side guard member and an outboard side guard member,
   wherein said inboard side guard member is apart from said outboard side guard member, and
   wherein said inboard side guard member covers a front portion and a front lower portion of a lower arm and includes an upright portion disposed in the proximity of a range of movement of an end portion of said outboard side guard member.

2. A saddle ride type all-terrain vehicle as set forth in claim 1, wherein said outboard side guard member includes an arcuate convex face.

3. A saddle ride type all-terrain vehicle as set forth in claim 1, wherein an end portion of said outboard guard member extends in a rearward direction.

4. A saddle ride type all-terrain vehicle as set forth in claim 1, wherein an end portion of said outboard guard member extends inwardly of said vehicle body.

5. A saddle ride type all-terrain vehicle as set forth in claim 1, wherein said lower arm includes a front arm provided on the front side of said vehicle and a rear arm provided rearwardly of said front arm, wherein
   an end portion of said outboard side guard member overlaps with said front arm when said wheels are turned to the maximum rotation.

6. A saddle ride type all-terrain vehicle as set forth in claim 1, wherein said outboard side guard member is a member wherein a caliper guard portion for covering a brake caliper from the inner side and the end portion provided at an end portion of said caliper guard member are formed integrally with each other.

7. A saddle ride type all-terrain vehicle having left and right front wheels supported independently of each other on a vehicle body such that driving power is transmitted to said front wheels by way of a pair of left and right drive shafts extending from a driving source side, said vehicle comprising:
- a first and second universal coupling provided at opposite end portions of each of said drive shafts, and
- a first and second rubber boot for covering each of said universal couplings;
- an inboard side guard member for covering said rubber boots, wherein said inboard side guard member covers a front portion and a front lower portion of a lower arm and includes an upright portion disposed in the proximity of a range of movement of the end portion of said outboard side guard member, and
- an outboard side guard member for covering said rubber boots, wherein said outboard side guard member is formed such that an end portion thereof extends in a rearward direction, wherein
- the lower arm includes a front arm provided on the front side of said vehicle and a rear arm provided rearwardly of said front arm, wherein the end portion of said outboard side guard member overlaps with said front arm when said wheels are steered in the maximum.

8. A saddle ride type all-terrain vehicle having left and right front wheels supported independently of each other on a vehicle body such that driving power is transmitted to said front wheels by way of a pair of left and right drive shafts extending from a driving source side, said vehicle comprising:
- a first and second universal coupling provided at opposite end portions of each of said drive shafts;
- a first and second rubber boot covering each of said universal couplings; and
- a protector covering each of said rubber boots, said protector comprising an inboard side guard member and an outboard side guard member,
- wherein said inboard side guard member is apart from said outboard side guard member, and
- wherein said inboard side guard member is attached to a suspension arm on which the front wheel is supported for upward and downward movement, and
- wherein said outboard side guard member is attached to a knuckle on which the front wheel is supported for rotation.

9. A saddle ride type all-terrain vehicle as set forth in claim 8, wherein said inboard side guard member is provided at a position of said suspension arm approximate to the center of said vehicle body.

10. A saddle ride type all-terrain vehicle as set forth in claim 8, wherein
- said inboard side guard member is attached to a bracket; and
- said bracket extends between and is attached to a front arm and a cross member, wherein
- said cross member extends between the front arm and a rear arm.

11. A saddle ride type all-terrain vehicle as set forth in claim 8, wherein said inboard side guard member and said outboard side guard member are disposed in an overlapping relationship with each other.

12. A saddle ride type all-terrain vehicle having left and right front wheels supported independently of each other on a vehicle body such that driving power is transmitted to said front wheels by way of a pair of left and right drive shafts extending from a driving source side, said vehicle comprising:
- a first and second universal coupling provided at opposite end portions of each of said drive shafts;
- a first and second rubber boot covering each of said universal couplings; and
- a protector covering each of said rubber boots, said protector comprising an inboard side guard member and an outboard side guard member,
- wherein said inboard side guard member is apart from said outboard side guard member, and
- wherein said outboard side guard member is formed integrally with a knuckle on which the front wheel is supported for rotation.

* * * * *